(12) United States Patent
Zatloukal et al.

(10) Patent No.: US 9,471,864 B2
(45) Date of Patent: Oct. 18, 2016

(54) ENCODING DATA IN DEPTH PATTERNS

(75) Inventors: Peter Zatloukal, Seattle, WA (US); Shane M. DeSeranno, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 446 days.

(21) Appl. No.: 13/531,268

(22) Filed: Jun. 22, 2012

(65) Prior Publication Data
US 2013/0342651 A1 Dec. 26, 2013

(51) Int. Cl.
G06K 19/06 (2006.01)

(52) U.S. Cl.
CPC .............. G06K 19/06159 (2013.01)

(58) Field of Classification Search
None
See application file for complete search history.

(56) References Cited

U.S. PATENT DOCUMENTS

| | | | |
|---|---|---|---|
| 7,028,902 B2* | 4/2006 | Xu et al. | 235/462.1 |
| 7,161,688 B1* | 1/2007 | Bonner et al. | 356/627 |
| 7,306,152 B2* | 12/2007 | Culp et al. | 235/462.01 |
| 7,757,952 B2* | 7/2010 | Tuschel et al. | 235/440 |
| 7,762,473 B2* | 7/2010 | Iftime et al. | 235/494 |
| 2007/0108288 A1 | 5/2007 | Caskey et al. | |
| 2008/0121727 A1 | 5/2008 | Iftime et al. | |
| 2009/0192731 A1 | 7/2009 | De Jesus et al. | |
| 2009/0231425 A1 | 9/2009 | Zalewski | |
| 2010/0055423 A1* | 3/2010 | Chretien et al. | 428/209 |
| 2011/0019162 A1 | 1/2011 | Huebner | |
| 2011/0270751 A1 | 11/2011 | Csinger et al. | |
| 2012/0047424 A1* | 2/2012 | Rothschild | 715/230 |
| 2012/0051601 A1* | 3/2012 | Simske et al. | 382/112 |
| 2012/0056988 A1* | 3/2012 | Stanhill et al. | 348/46 |
| 2012/0096499 A1* | 4/2012 | Dasher et al. | 725/87 |
| 2012/0120200 A1* | 5/2012 | Newton et al. | 348/46 |
| 2012/0147147 A1* | 6/2012 | Park et al. | 348/49 |

FOREIGN PATENT DOCUMENTS

| | | |
|---|---|---|
| CN | 102439607 A | 5/2012 |
| GB | 2307762 A | 6/1997 |

OTHER PUBLICATIONS

ISA European Patent Office, International Search Report & Written Opinion for PCT/US2013/046671, Oct. 7, 2013, 9 pages.
Simske, et al., "Revenge of the Physical—Mobile Color Barcode Solutions to Security Challenges", Retrieved at <<https://www.hpl.hp.com/techreports/2010/HPL-2010-7.pdf>>, Optical Document Security, San Francisco, Jan. 20-22, 2010, pp. 15.
The State Intellectual Property Office of China, First Office Action and Search Report Issued in Chinese Patent Application No. 201310251823.7, Oct. 9, 2015, China, 13 pages.
The State Intellectual Property Office of China, Second Office Action and Search Report issued in Chinese Patent Application No. 201310251823.7, Jun. 20, 2016, China, 14 pages.

\* cited by examiner

*Primary Examiner* — Reza Aghevli
(74) *Attorney, Agent, or Firm* — Gregg Wisdom; Judy Yee; Micky Minhas

(57) ABSTRACT

A depth imaging system comprises a depth camera input to receive a depth map representing an observed scene imaged by a depth camera, the depth map including a plurality of pixels and a depth value for each of the plurality of pixels. The depth imaging system further comprises a tag identification module to identify a 3D tag imaged by the depth camera and represented in the depth map, the 3D tag comprising one or more depth features, each of the one or more depth features comprising one or more characteristics recognizable by the depth camera. The depth imaging system further comprises a tag decoding module to translate the one or more depth features into machine-readable data.

18 Claims, 3 Drawing Sheets

ENCODING DATA IN DEPTH PATTERNS

BACKGROUND

Barcodes provide an optical machine-readable representation of data. Typical barcode technologies may encode data in just one or two dimensions, and may require the barcode to be in a specific orientation and/or position in order to recognize and decode the barcode.

SUMMARY

Embodiments are disclosed that relate to 3D tags and depth imaging systems for decoding 3D tags. One disclosed embodiment includes a depth imaging system comprising a depth camera input to receive a depth map representing an observed scene imaged by a depth camera, the depth map including a plurality of pixels and a depth value for each of the plurality of pixels. The depth imaging system further comprises a tag identification module to identify a 3D tag imaged by the depth camera and represented in the depth map, the 3D tag comprising one or more depth features, each of the one or more depth features comprising one or more characteristics recognizable by the depth camera. The depth imaging system further comprises a tag decoding module to translate the one or more depth features into machine-readable data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Barcodes are a ubiquitous technology, especially in retail environments. There presently exists several schemes for encoding information via one-dimensional (e.g., Universal Product Code "UPC") and two-dimensional (e.g., Quick Response® "QR") barcodes. However, such technologies offer a low encoding density due to resolution limitations in producing and/or imaging 1D/2D markings, and may therefore rely on external information (e.g., information database) to extract meaningful data from the barcode. In other words, current barcode technologies may merely be suitable to act as a pointer to the desired information.

The present disclosure is directed towards 3D tags comprising one or more depth features that collectively encode information in three dimensions. The increased data density allows such tags to store "self-contained" data (e.g., audio track, image, etc.), as opposed to mere "pointers," although the 3D tags may alternatively or additionally be used as pointers. As used herein, the term "depth feature" refers to any feature of a 3D tag that encodes information that is not human-readable via one or more characteristics recognizable by a depth camera (e.g., reflective surfaces, raised surfaces, depressed surfaces, or surface gradients, among others). The 3D tags may comprise any number, type, and combination of depth features and characteristics thereof. Furthermore, as used herein, the term "tag" refers to one or more depth features collectively encoding information, and does not imply any specific configuration (e.g., adhesive-backed structure) or use case scenario (e.g., pricing or identification "tag"). Specific examples of depth features and characteristics will be discussed in greater detail below.

Figure 1:
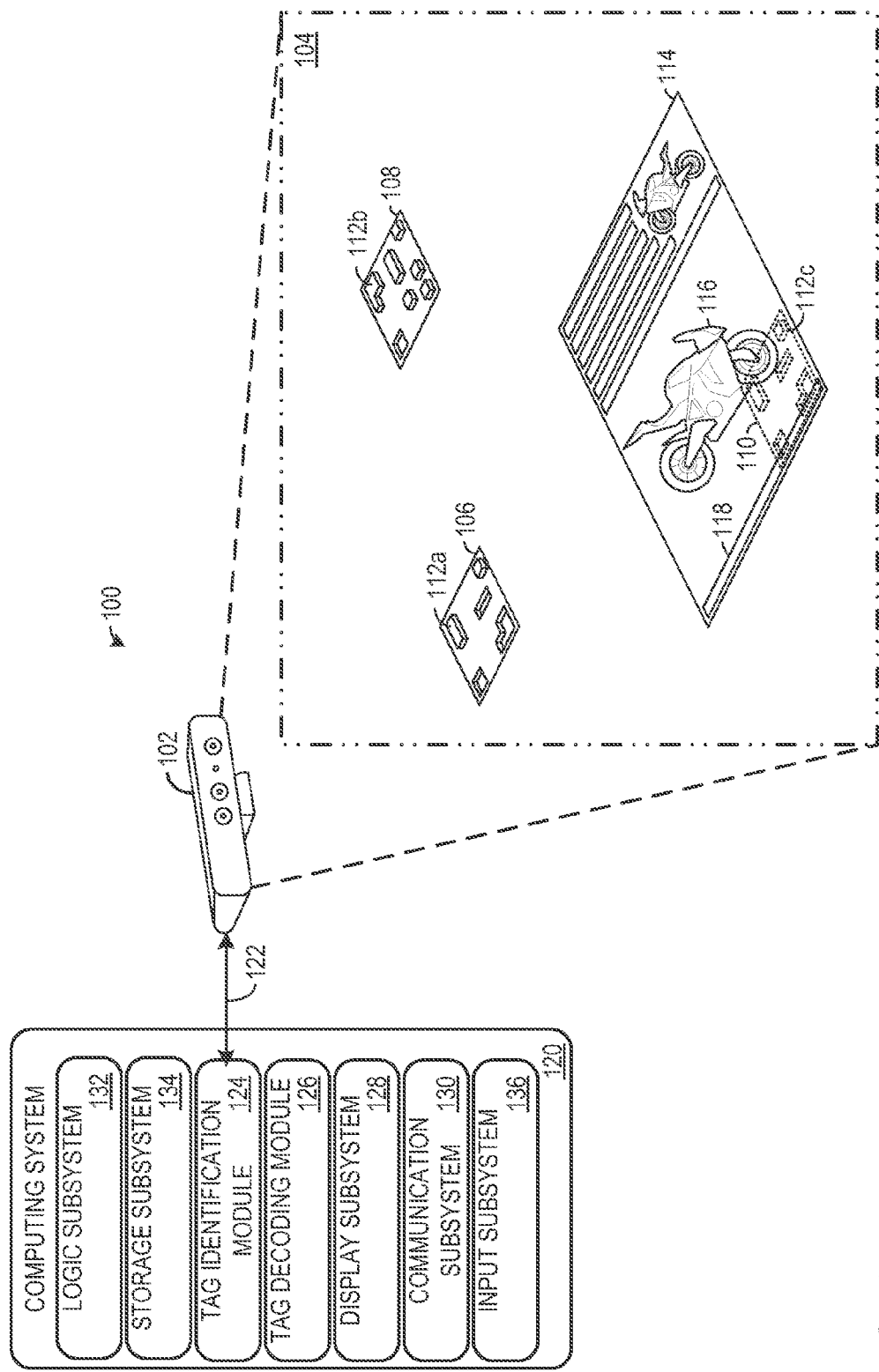
FIG. 1 shows an embodiment of an example use environment for decoding 3D tags.

FIG. 1 shows an embodiment of an example use environment 100 for decoding 3D tags. Use environment 100 includes depth camera 102 configured to image observed scene 104. Observed scene 104 includes 3D tags 106, 108, and 110, each 3D tag comprising one or more depth features 112 (e.g., depth feature 112a, depth feature 112b, and depth feature 112c). Although the discussion is directed towards three 3D tags, depth camera 102 may be configured to image more or fewer 3D tags. The ability to image multiple 3D tags may be determined by the resolution of the depth camera, and/or the capabilities of the computing system, for example.

While illustrated as comprising depressed and raised polygons, it will be understood that depth features 112 may comprise any one or more features recognizable by the depth camera in any configuration and combination, as mentioned above. Specific examples of depth features will be discussed in greater detail below with reference to FIGS. 2-4.

It will be appreciated that observed scene 104 may further include objects that are not 3D tags (e.g., furniture, people, etc.). It will be further appreciated that, although 3D tags 106 and 108 are illustrated as being self-contained objects of observed scene 104, 3D tags 106 and 108 may be affixed to, or incorporated into, any suitable surface. For example, observed scene 104 further includes surface 114 (e.g., retail box, product surface, advertisement, etc.), on which 3D tag 110 is embossed (represented by dashed outline). Surface 114 may further include information that is human-readable, such as visible light image 116 and text 118. An example surface similar to surface 114 will be discussed in greater detail below in with reference to FIG. 5.

Further, although illustrated as being substantially square, it will be appreciated that the 3D tags may comprise any suitable shape. For example, in embodiments where the 3D tag is incorporated into a surface, the 3D tag may not include a visibly-defined "shape," such as a printed border. While surface 114 is illustrated as being substantially planar, it is to be understood that nonplanar surfaces may have 3D tags.

Yet further, although illustrated as having substantially equivalent orientations within observed scene 104, 3D tags (e.g., 3D tags 106, 108, and 110) may have any position and orientation within observed scene 104. Accordingly, a 3D tag may include one or more registration features and/or boundary features to differentiate the 3D tag from the surrounding surfaces. Such features will be discussed in greater detail below with reference to FIG. 2.

Use environment 100 further comprises a computing system 120 including a depth camera input 122 to receive information from depth camera 102. For example, said information may include a depth image representing observed scene 104. The depth map may include a plurality of pixels and a depth value for each of said pixels. The depth map may take the form of virtually any suitable data structure, including, but not limited to, a matrix that includes a depth value for each pixel of the observed scene. Depth camera 102 may be configured to measure depth using any suitable technique or combination of techniques (e.g., timeof-flight, structured light, stereo image, etc.). In some embodiments, depth camera 102 may further comprise a visible light sensor in order to decode 1D/2D tags (e.g., UPC, QR, etc.).

In some embodiments, depth camera input 122 may comprise a physical connector (e.g., Universal Serial Bus connector). In other embodiments where depth camera 102 is incorporated into computing system 120 (e.g., mobile device scenarios), depth camera input 122 may comprise one or more connections internal to computing system 120.

As described above, observed scene 104 may include objects (e.g., surface 114) that are not 3D tags. Accordingly, computing system 120 further comprises tag identification module 124 configured to identify the one or more 3D tags (e.g., 3D tags 106, 108, and 110) imaged by depth camera 102 and represented in the depth map. Computing system 120 further comprises tag decoding module 126 configured to translate the one or more depth features 112 into machine-readable data (e.g., binary data and/or other forms of data that may be stored by and/or communicated between computers). Tag identification module 124 and tag decoding module 126 may provide the functionality described above via any suitable mechanism or combination of mechanisms.

The machine-readable data may be manipulated according to specific use case scenarios. For example, the machine-readable data may be presented to the user via display subsystem 128 and display devices coupled thereto. As another example, the machine-readable data may be transmitted to a remote device (e.g., pricing database server) via communication subsystem 130. It will be understood that these scenarios are presented for the purpose of example, and that the machine-readable data may be utilized by any mechanism or combination of mechanisms without departing from the scope of the present disclosure.

Figure 2:
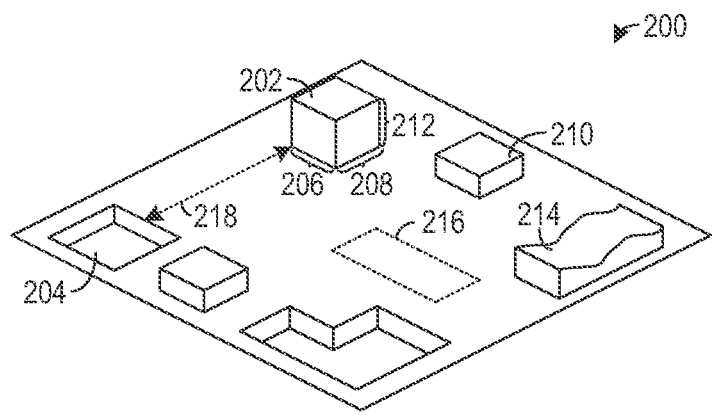
FIGS. 2-4 show example embodiments of 3D tags.
Figure 3:
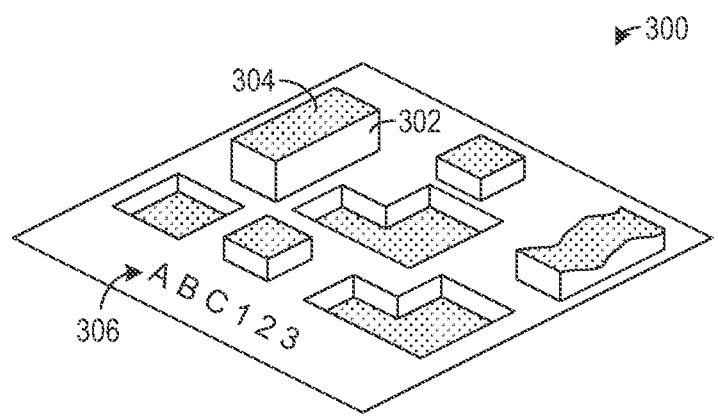
Figure 4:
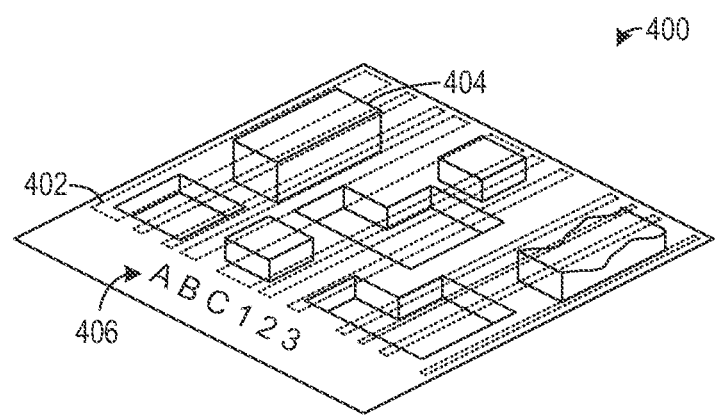

3D tags may include any combination, type, and number of depth features and characteristics. Accordingly, FIGS. 2-4 show various example embodiments of 3D tags. Beginning with FIG. 2, an embodiment of a 3D tag 200 comprising a plurality of depth features is shown. For example, 3D tag 200 comprises depth features 202 and 204 in the form of a raised surface and a depressed surface, respectively. In contrast to 2D barcodes where each feature encodes information via width and/or length, depth features 202 and 204 further encode information in a third dimension (i.e., depth). For example, as illustrated, depth feature 202 is characterized by width 206 and length 208 comparable to depth feature 210. Thus in 2D or 1D scenarios, depth features 202 and 210 may be interpreted as substantially comparable features. However, as illustrated, depth feature 202 is characterized by a different depth 212 than depth feature 210, such that depth features 202 and 210 are distinguishable via a 3D imaging sensor (e.g., depth camera 102 of FIG. 1).

It will be appreciated from the above discussion that one or more physical characteristics (e.g., width 206, length 208, and depth 212 of depth feature 202) may be configured to encode data independently and/or in combination with one or more other characteristics. For example, in some embodiments, it will be appreciated that the shape of a depth feature may be configured to encode data.

While depth features 202, 204, and 210 are illustrated as having a substantially constant depth across the entire feature, 3D tag 200 further includes depth feature 214 characterized by one or more depth gradients (i.e., continuous position-varying depth). A depth gradient may encode information via the change in depth across a contiguous portion of the 3D tag.

3D tag 200 further includes depth feature 216 comprising one or more optical properties. For example, depth feature 216 may comprise one or more materials comprising a very high reflectivity and/or very low reflectivity (i.e., high light absorption). In some embodiments, depth feature 216 may comprise varying optical characteristics according to light wavelength. For example, depth feature 216 may be highly reflective or absorbent at infrared or near-infrared wavelengths (e.g., wavelengths used by infrared transmitters in some depth camera technologies), while having an intermediate reflectivity at visible light wavelengths. By utilizing materials with such properties, some depth camera technologies (e.g., emissive depth cameras) may interpret depth feature 216 as having a depth relative to the surface of 3D tag 200 even though depth feature 216 is substantially level with the surface. As with other characteristics, optical characteristics may vary with position along the depth feature. Such characteristics may therefore be configured to provide a "depth gradient" via position-dependent optical characteristics, as opposed to position-dependent physical characteristics.

As mentioned above, depth features (e.g., depth features 202, 204, 210, 214, or 216) may encode information via a plurality of characteristics. For example, depth feature 214 may encode information via width and length in addition to via the illustrated surface gradient. It will be further understood that 3D tags may comprise a single depth feature comprising one or more characteristics. For example, a 3D tag may comprise a single depth feature comprising a surface gradient.

Instead of, or in addition to, encoding information via characteristics (e.g., depth, height, width, reflectivity, gradient, etc.) of individual depth features, information may be encoded via the relationship (e.g., relative position) between one or more depth features of 3D tag 200. For example, information may be encoded via distance 218 between one or more depth features. As another example, information may be encoded via the absolute position (e.g., relative position to the one or more registration features described below) of one or more depth features on 3D tag 200. For example, depth feature 210 may encode different information when positioned in the bottom right corner of 3D tag 200, even if other characteristics remain unchanged. Such scenarios are presented for the purpose of example, and are not intended to be limiting in any manner.

As described above with reference to FIG. 1, 3D tag 200 may be incorporated (e.g., embossed, etc.) onto a surface such that there is not a visibly-defined boundary of 3D tag 200. Further, 3D tag 200 may be positioned in front of the depth camera (e.g., within observed scene 104 imaged by depth camera 102 of FIG. 1) in any orientation. Accordingly, one or more of the features of the 3D tag may be configured to provide registration and/or orientation information about 3D tag 200. For example, in some embodiments, one or more depth features may have a characteristic shape and/or other aspect which can be identified regardless of orientation, thus providing a reference from which orientation of the 3D tag may be determined. In such embodiments, the registration feature may not encode additional information. It will be understood that any depth feature, or combination of features, comprising any one or more characteristics may provide registration and/or orientation information without departing from the scope of the present disclosure.

FIG. 3 shows another embodiment of a 3D tag 300. 3D tag 300 includes a plurality of depth features 302 encoding information via any one or more characteristics (e.g., length, width, depth, gradient, etc.), as described above. 3D tag 300 further comprises a plurality of distinguishable 2D features 304 (illustrated as a printed overlay of the depth features) corresponding to the one or more depth features. Although 3D tag 300 is illustrated as comprising a corresponding 2D feature 304 for each depth feature 302, it will be understood that other embodiments may comprise corresponding 2D features 304 for a subset of the depth features 302. Further, although 2D features 304 are illustrated as being oriented over the entirety of each depth feature 302, it will be understood that 2D features 304 may be oriented over a portion of one or more corresponding depth features 302. Further, 2D features may be located in spaces between depth features.

2D features 304 collectively encode information that is not human readable. The 2D features are configured to be read by a visible light camera (e.g., one or more visible light imaging sensors of depth camera 102). In some embodiments, the information encoded by the plurality of distinguishable 2D features may comprise at least a subset of the information encoded by the plurality of distinguishable depth features. For example, 2D features 304 may provide a redundancy mechanism wherein depth features 302 are decoded by a depth camera, 2D features 304 are decoded by a visible light camera, and the two results are compared to ensure the integrity of 3D tag 300. As another example, 2D features 304 may be decoded when access to a 3D imaging system is not available, and may thus provide the at least some of the same information regardless of the capabilities of the imaging system. Alternatively, 2D features 304 may encode different information than depth features 302. Such a configuration may be utilized to increase data density of 3D tag 300 and/or to provide varying information according to the capabilities of the imaging system.

3D tag 300 further comprises a human-readable representation 306 of at least a subset of the information encoded by depth features 302 and/or 2D features 304. Representation 306 may provide an additional layer of redundancy. For example, if 3D tag 300 becomes damaged, representation 306 may allow a user to extract at least a subset of the encoded information directly (i.e., without the use of an imaging system).

In other embodiments, the 2D features may not correspond to the depth features, and/or may encode different information. An example of such a configuration is shown by 3D tag 400 of FIG. 4. 3D tag 400 comprises a plurality of 2D features 402 collectively encoding information that is not human-readable. For example, as illustrated, 2D features 402 may comprise "bars" of a 1D barcode. It will be understood that although 2D features 402 are illustrated via dashed-outlines for sake of clarity, 2D features 402 are visible features (e.g., printed bars or squares) overlapping depth features 404. 3D tag 400 may further comprise a human-readable representation 406. Representation 406 may comprise a representation of the information encoded by 2D features 402 and/or depth features 404 and/or other information.

Figure 5:
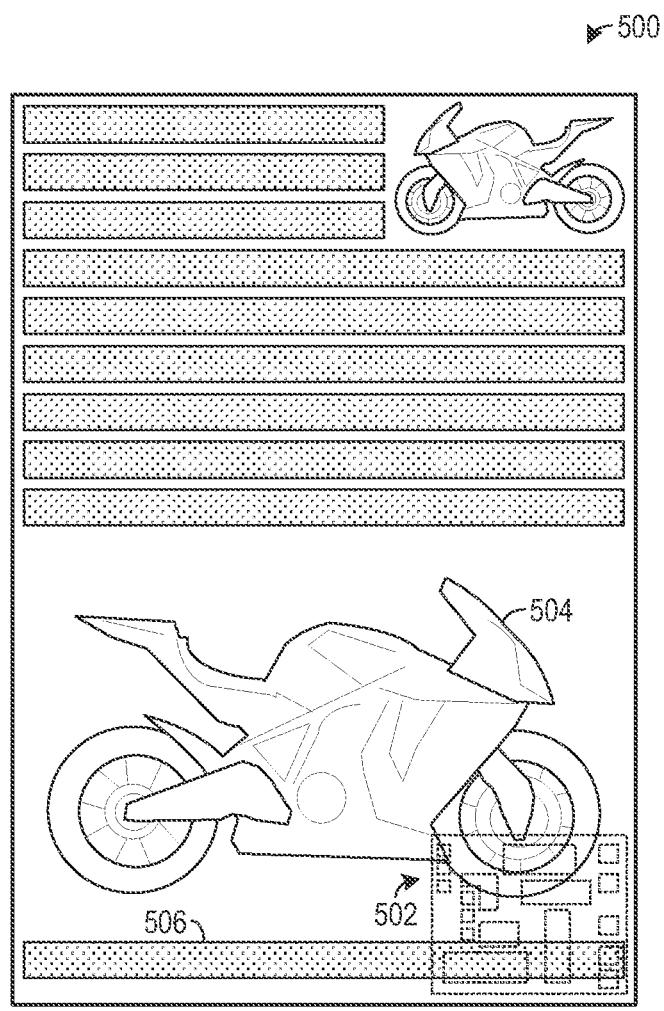
FIG. 5 shows an example embodiment of a surface comprising a 3D tag.

Turning now to FIG. 5, an example of an embodiment of a surface 500 comprising a 3D tag 502 is shown. Surface 500 may comprise visible light image 504 and/or text 506. Although illustrated as a planar, printed page (e.g., page from a magazine, newspaper, etc.), it will be understood that surface 500 may have any suitable configuration comprising 3D tag 502 and one or more of image 504 and text 506. For example, surface 500 may comprise a surface, planar or non-planar, of a product and/or packaging thereof.

As yet another example, surface 500 may comprise a poster or other advertisement. In such a scenario, a passerby may be able to view image 504, read text 506, and decode 3D tag 502 (e.g., via depth camera 102 of FIG. 1) to extract additional information (e.g., sound/video clip, a coupon/special offer, link to a website, etc.). It will be understood that such scenarios are presented for the purpose of example, and that surface 500, and thus 3D tag 502, may be utilized in a variety of use case scenarios without departing from the scope of the present disclosure.

It will be appreciated that although image 504 and text 506 are illustrated as at least partially overlapping 3D tag 502, both the information encoded by 3D tag 502 and the human-readable information (e.g., image 504 and text 506) of surface 500 remain recognizable by a depth camera (e.g., depth camera 102 of FIG. 1) and a human user, respectively. In other words, 3D tag 502 and the features thereof may be configured such that the human-readability of surface 500 is not restricted. It will be understood that 3D tag 502 may not be invisible to the user, but may rather be substantially unobtrusive such that any overlaying images and/or text (e.g., image 504 and text 506) remains human-readable. For example, 3D tag 502 may be embossed onto surface 500 such that 3D tag 502 appears as a group of bumps and depressions on surface 500 without obstructing image 504 and/or text 506. As another example, 3D tag 502 may include features of varying reflectivities such that 3D tag 502 appears as an area of varying "glossiness".

The methods and processes described above may be tied to a computing system of one or more computing devices. In particular, such methods and processes may be implemented as a computer-application program or service, an application-programming interface (API), a library, and/or other computer-program product.

FIG. 1 schematically shows a computing system 120 that can enact one or more of the methods and processes described above. Computing system 120 is shown in simplified form. It will be understood that virtually any computer architecture may be used without departing from the scope of this disclosure. In different embodiments, computing system 120 may take the form of a mainframe computer, server computer, desktop computer, laptop computer, tablet computer, home-entertainment computer, network computing device, gaming device, mobile computing device, mobile communication device (e.g., smart phone), etc.

Computing system 120 includes a logic subsystem 132, a storage subsystem 134, a tag identification module 124, and a tag decoding module 126. Computing system 120 may optionally include a display subsystem 128, input subsystem 136, communication subsystem 130, and/or other components not shown in FIG. 1.

Logic subsystem 132 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 134 includes one or more physical, non-transitory, devices configured to hold data and/or instructions executable by the logic subsystem to implement the methods and processes described herein. When such methods and processes are implemented, the state of storage subsystem 134 may be transformed—e.g., to hold different data.

Storage subsystem 134 may include removable media and/or built-in devices. Storage subsystem 134 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 134 may include volatile, nonvolatile, dynamic, static, read/write, read-only, random-access, sequential-access, location-addressable, file-addressable, and/or content-addressable devices.

It will be appreciated that storage subsystem 134 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 132 and of storage subsystem 134 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 120 implemented to perform a particular function. Tag identification module 124 and tag decoding module 126 are two non-limiting examples of modules. In some cases, a module, program, or engine may be instantiated via logic subsystem 132 executing instructions held by storage subsystem 134. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 128 may be used to present a visual representation of data held by storage subsystem 134. This visual representation may take the form of a graphical user interface (GUI). As the herein described methods and processes change the data held by the storage subsystem, and thus transform the state of the storage subsystem, the state of display subsystem 128 may likewise be transformed to visually represent changes in the underlying data. Display subsystem 128 may include one or more display devices utilizing virtually any type of technology. Such display devices may be combined with logic subsystem 132 and/or storage subsystem 134 in a shared enclosure, or such display devices may be peripheral display devices.

When included, input subsystem 136 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 130 may be configured to communicatively couple computing system 120 with one or more other computing devices. Communication subsystem 130 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 120 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A depth imaging system, comprising:
   a depth camera input to receive a depth map representing an observed scene optically imaged by a depth camera, the depth map including a depth value for each pixel in a two-dimensional matrix of pixels, each depth value representing a distance from the depth camera to a surface that is optically imaged by the depth camera for a corresponding pixel in the two-dimensional matrix of pixels, the depth camera including an infrared transmitter and an infrared image sensor configured to measure a time-of-flight of infrared light transmitted from the infrared transmitter and reflected back to the infrared image sensor for each pixel in the two-dimensional matrix of pixels, the depth camera further comprising visible light imaging sensors configured to measure visible ambient light reflected to the visible light imaging sensors for each pixel in the two dimensional matrix of pixels;
   a tag identification module to identify a 3D tag imaged by the depth camera and represented in the depth map, the 3D tag comprising one or more depth features, each of the one or more depth features comprising one or more characteristics recognizable by the depth camera; and a tag decoding module to translate the one or more depth features into machine-readable data.

2. The depth imaging system of claim 1, where the one or more depth features include one or more depressed surfaces.

3. The depth imaging system of claim 1, where the one or more depth features include one or more raised surfaces.

4. The depth imaging system of claim 1, where the one or more characteristics include a depth gradient.

5. The depth imaging system of claim 1, where the one or more characteristics includes reflectivity.

6. The depth imaging system of claim 1, where the one or more depth features collectively encode information that is not human readable, the 3D tag further comprising a visible light image separate from and overlaying the one or more depth features, the visible light image providing information that is human readable.

7. The depth imaging system of claim 6, where the visible light image includes a human-readable representation of the information encoded by the one or more depth features.

8. The depth imaging system of claim 1, where the one or more depth features include one or more registration features.

9. A depth imaging system, comprising:
a depth camera input to receive a depth map representing an observed scene optically imaged by a depth camera, the depth map including a depth value for each pixel in a two-dimensional matrix of pixels, each depth value representing a distance from the depth camera to a surface that is optically imaged by the depth camera for a corresponding pixel in the two-dimensional matrix of pixels, the depth camera including an infrared transmitter and an infrared image sensor configured to measure a time-of-flight of infrared light transmitted from the infrared transmitter and reflected back to the infrared image sensor for each pixel in the two-dimensional matrix of pixels, the depth camera further comprising visible light imaging sensors configured to measure visible ambient light reflected to the visible light imaging sensors for each pixel in the two dimensional matrix of pixels;
a tag identification module to identify a 3D tag imaged by the depth camera and represented in the depth map, the 3D tag comprising one or more depth features comprising one or more depth gradients; and
a tag decoding module to translate the one or more depth gradients into machine-readable data.

10. The depth imaging system of claim 9, where the one or more depth gradients collectively encode information that is not human readable, the 3D tag further comprising a visible light image separate from and overlaying the one or more depth features, the visible light image providing information that is human readable.

11. The depth imaging system of claim 10, where the visible light image includes a human-readable representation of information encoded by the one or more depth gradients.

12. A 3D tag, comprising:
a two-dimensional matrix of distinguishable depth features including one or more characteristics optically depth-readable by a depth camera, the two-dimensional matrix of distinguishable depth features collectively encoding information that is not human readable; and
a visible light image separate from and overlaying at least a portion of the two-dimensional matrix of distinguishable depth features, wherein the visible light image includes:
a plurality of distinguishable 2D features configured to be read by a visible light camera, and
at least a subset of the information encoded by the plurality of distinguishable depth features, wherein the visible light image does not interfere with optical depth-reading of the two-dimensional matrix of distinguishable depth features by the depth camera.

13. The 3D tag of claim 12, where the two-dimensional matrix of distinguishable depth features include one or more depressed surfaces.

14. The 3D tag of claim 12, where the two dimensional matrix of distinguishable depth features include one or more raised surfaces.

15. The 3D tag of claim 12, where the one or more characteristics include reflectivity.

16. The 3D tag of claim 12, where the one or more characteristics include a depth gradient.

17. The 3D tag of claim 12, where the visible light image includes a human-readable representation of information encoded by the two-dimensional matrix of distinguishable depth features.

18. The 3D tag of claim 12, where each of the distinguishable 2D features corresponds to one or more distinguishable depth features.

* * * * *